United States Patent
Elend

(10) Patent No.: US 9,729,329 B2
(45) Date of Patent: Aug. 8, 2017

(54) COMMUNICATIONS SECURITY

(71) Applicant: NXP B.V., Eindhoven (NL)

(72) Inventor: Bernd Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 14 days.

(21) Appl. No.: 14/716,570

(22) Filed: May 19, 2015

(65) Prior Publication Data
US 2016/0344555 A1 Nov. 24, 2016

(51) Int. Cl.
H04L 9/32 (2006.01)
G06F 21/60 (2013.01)
G06F 21/71 (2013.01)
H04L 12/40 (2006.01)
H04L 29/06 (2006.01)

(52) U.S. Cl.
CPC .......... *H04L 9/3247* (2013.01); *G06F 21/606* (2013.01); *G06F 21/71* (2013.01); *H04L 12/40032* (2013.01); *H04L 63/123* (2013.01); *H04L 63/162* (2013.01); *H04L 9/32* (2013.01); *H04L 2012/40215* (2013.01); *H04L 2012/40273* (2013.01); *H04L 2209/122* (2013.01); *H04L 2209/84* (2013.01)

(58) Field of Classification Search
CPC ..................................................... H04L 9/3247
USPC ....................................................... 713/176
See application file for complete search history.

(56) References Cited

U.S. PATENT DOCUMENTS

| | | | |
|---|---|---|---|
| 6,278,864 B1* | 8/2001 | Cummins | H04W 52/0274 455/260 |
| 7,885,405 B1 | 2/2011 | Bong | |
| 2002/0138736 A1* | 9/2002 | Morin | H04N 21/23611 713/180 |
| 2005/0114700 A1 | 5/2005 | Barrie et al. | |
| 2005/0286564 A1* | 12/2005 | Hatley | H04L 43/106 370/503 |
| 2006/0088060 A1* | 4/2006 | Fujikami | H04L 1/0041 370/474 |
| 2007/0011396 A1* | 1/2007 | Singh | G06F 13/4059 711/105 |
| 2008/0046142 A1* | 2/2008 | Jordan | H04L 12/40195 701/36 |

(Continued)

FOREIGN PATENT DOCUMENTS

DE 102012210327 A1 12/2013
EP 2712123 A1 3/2014
(Continued)

Primary Examiner — Matthew Henning
(74) Attorney, Agent, or Firm — Rajeev Madnawat

(57) ABSTRACT

Examples herein are directed to communicating on a communication bus in accordance with a message-based signal protocol. One or more messages are generated with a data field, in which a portion of the data field is reserved for a signature. The signature has a bit length corresponding to a bit length of the reserved portion of the data field. The signature is coded in the portion of the data field reserved for the signature, and at least one message is transmitted with the signature coded therein. Each message received on the communication bus and having a signature coded in a data field therein is authenticated based on the signature, and processed by removing the signature from the data field and decoding the message with the signature removed.

20 Claims, 2 Drawing Sheets

(56) References Cited

U.S. PATENT DOCUMENTS

| | | | |
|---|---|---|---|
| 2008/0049757 A1* | 2/2008 | Bugenhagen | H04L 12/2602 370/395.1 |
| 2010/0211793 A1* | 8/2010 | Park | H04N 7/162 713/176 |
| 2012/0093312 A1* | 4/2012 | Gammel | H04L 9/0631 380/255 |
| 2012/0204034 A1* | 8/2012 | Martinez | H04L 1/1607 713/176 |
| 2012/0246535 A1* | 9/2012 | Kagan | H04L 67/1097 714/752 |
| 2014/0096271 A1* | 4/2014 | Wang | G06F 21/10 726/30 |
| 2014/0365693 A1 | 12/2014 | Monroe et al. | |
| 2015/0121484 A1* | 4/2015 | Liu | G06F 17/30887 726/5 |

FOREIGN PATENT DOCUMENTS

| | | |
|---|---|---|
| WO | 2013175633 A1 | 11/2013 |
| WO | 2015008114 A1 | 1/2015 |

\* cited by examiner

COMMUNICATIONS SECURITY

Aspects of various embodiments are directed to communications, and to providing security within communications.

Many communications are subject to security concerns. For example, wireless and large area network communications can be subject to deceptive interception or interference. These and other types of communications may also be subject to inadvertent security problems, which may make certain communications challenging to implement.

Various small networks and closed-loop networks are used for automotive, machine control and other types of applications. In such networks, certain communications are prioritized, and some may be important for safety or other types of concerns. Accordingly, security in communications, even in a system involving closed-loop communications, can be important. For instance, networks such as a controller area network (CAN), local interconnect networks (LIN), and other in-vehicle networks (IVN) can be used in closed loops for automotive applications, in which certain communications (e.g., controlling braking systems) can be important.

More specifically regarding the CAN standard/protocol, applications include vehicles, aerospace, and medical equipment. The CAN standard can provide communications between microcontrollers and devices using a message protocol, which can be carried out without relying upon a master/host computer. The use of the CAN-bus protocol for an ever growing array of different applications has resulted in increased demand for data bandwidth. A CAN protocol with Flexible Data-Rate (CAN FD), is designed to provide data bandwidth that is 1 MBit/s or higher and with payloads longer than 8 bytes per frame. The CAN FD protocol is designed to use the same physical layer as the older CAN protocol (e.g., the BOSCH CAN Specification 2.0).

Many approaches to securing communications have been effected for a variety of applications. For instance, special security circuitry, and complex security protocols can be implemented. However, these approaches can result in latency and/or require relatively high processing power. Further, to the extent that additional circuitry is required, this can increase cost and complexity.

These and other matters have presented challenges to the implementation of secure communications, for a variety of applications.

Various example embodiments are directed to communications circuits, methods and their implementation.

In accordance with one or more embodiments, an apparatus includes a transceiver circuit that communicates data on a communication bus in accordance with a message-based signal protocol, a message coder circuit and a security circuit. The message coder circuit operates with the transceiver circuit to generate at least one message having a data field, while reserving a portion of the data field for a signature. The security circuit calculates the signature having a bit length corresponding to a bit length of the portion of the data field reserved for the signature, and codes the signature in the portion of the data field reserved for the signature. The transceiver circuit communicates the data on the communication bus by transmitting the at least one message having the signature coded therein. The security circuit operates with the message coder circuit to, for each message received on the communication bus and having a signature coded in a data field therein, authenticate the message based on the signature, remove the signature from the data field, and decode the message with the signature removed therefrom via the message coder circuit.

A method-based embodiment operates as follows. At least one message having a data field is generated, and a portion of the data field is reserved for a signature. The signature is calculated as having a bit length corresponding to a bit length of the portion of the data field reserved for the signature, and the signature is coded in the portion of the data field reserved for the signature. The data is communicated on a communication bus in accordance with a message-based signal protocol by transmitting the at least one message having the signature coded therein. For each message received on the communication bus and having a signature coded in a data field therein, the message is authenticated based on the signature, the signature is removed from the data field, and the message is decoded with the signature removed therefrom.

Another embodiment is directed to an apparatus having a vehicle network communication bus, a vehicle control circuit that generates a control signal and that operates with an external circuit to modify an operational characteristic of a vehicle in which the vehicle network communication bus operates, and a plurality of network circuit nodes. One of the network circuit nodes includes a transceiver circuit, message coder circuit and security circuit. The transceiver circuit communicates data on the vehicle network communication bus in accordance with a message-based signal protocol, and the message coder circuit operates with the transceiver circuit to generate messages having a data field and in which a portion of the data field is reserved for a signature. The security circuit calculates the signature having a bit length corresponding to a bit length of the portion of the data field reserved for the signature, and to code the signature in the portion of the data field reserved for the signature. The transceiver circuit communicates the data on the communication bus by transmitting the at least one message having the signature coded therein. The security circuit operates with the message coder circuit to, for each message received on the communication bus and having a signature coded in a data field therein, authenticate the message based on the signature, remove the signature from the data field, and decode the message with the signature removed therefrom via the message coder circuit. The vehicle control circuit operates aspects of the vehicle based on the decoded message (e.g., by activating an engine ignition system, unlocking doors, controls engine characteristics such as ensuring a motor torque, providing a certain deceleration in braking). In some implementations, the security circuit responds to one of the messages not being authenticated (e.g., the signature not being found as valid) by modifying the message. The message coder circuit operates with the security circuit to interact with the one of the messages as being invalid based on the modification thereof by the security circuit.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
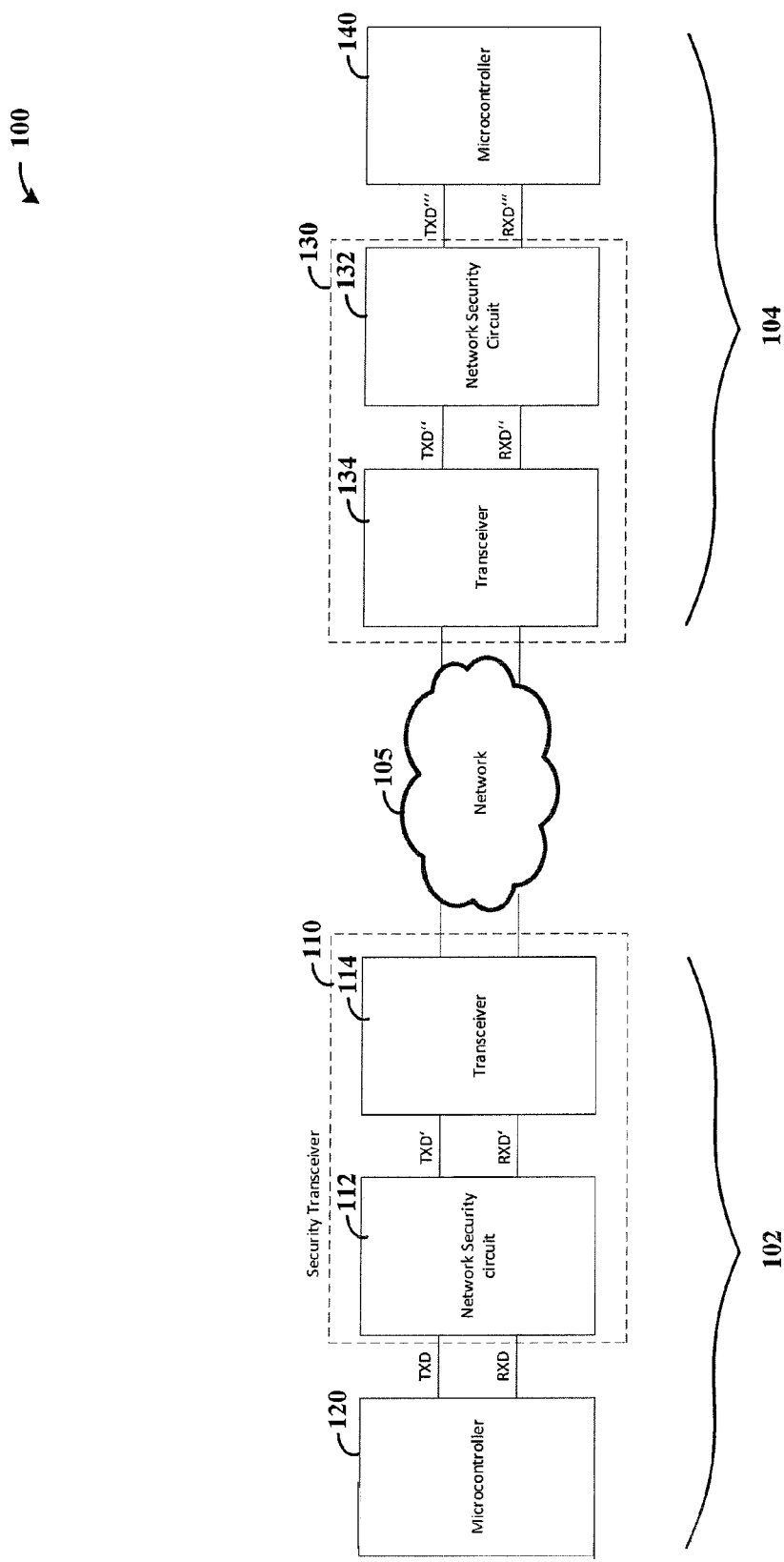
FIG. 1 shows an apparatus, in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving security with communications. Particular applications involve secure communications within a network, which can be achieved without adding latency or changing hardware in a corresponding microcontroller or protocol controller. In this context, certain embodiments are directed to circuitry and related operations involving the communication of signatures within messages. This approach facilitates verification of a sender using an existing framework, and without necessarily adding latency or requiring additional circuitry. While not necessarily so limited, various aspects may be appreciated through a discussion of examples using this context.

Various example embodiments are directed to communicating data over a communication link in which security information is added in a reserved portion of a data field. Such communications involve a network, such as a CAN network (e.g., employing the CAN ED protocol), in which data is communicated in a manner that facilitates the incorporation of security information therein. In certain embodiments, a transceiver-type circuit or network node is equipped with a coder, such as a protocol decoder, and a security circuit such as a secure element. One or more such transceiver-type circuits may be combined and used in a communications system, for various embodiments. The reserved portion of the data field is set to a known signature length of M bits, which can be added to the message data. A fixed bit pattern can thus be appended to an original message to achieve the resulting message length.

In some implementations in which a transceiver is transmitting a message, a secure element calculates a signature. At a point that is M bits before the end of the data section in the message, the transceiver ignores any serial data input and transmits the bit sequence forming the signature that has been calculated by the secure element, thus replacing the fixed bit pattern in the specific message. Such an approach can be implemented in embodiments in which data is transmitted in several messages, with one or more of the messages including the signature. Other embodiments involve the transmission of data having a length that is less than available data bit lengths (with the M bits reserved). After inserting the signature, the transceiver returns to normal operation and transmits a remainder of any message (e.g., cyclic redundancy check (CRC) data, and an end-of-frame sequence).

For receiving such messages, a receiving transceiver can use a known signature bit length to determine which portion of a data field is used for a signature, and which portion for data. For instance, consistent with the above example a receiving transceiver can stop reflecting that a message is being received M bits before the end of a data section, and present the fixed bit pattern to a receiving circuit (replacing the signature). If the signature does not appear to be valid, the receiving transceiver can invalidate the message (e.g., by presenting an invalid CRC or end-of-frame field to the receiver).

In accordance with one or more embodiments, an apparatus includes a transceiver, message coder (e.g., encoder/decoder) and security circuit. The transceiver communicates data on a communication bus in accordance with a message-based signal protocol. The message coder operates with the transceiver to generate messages having a data field, while reserving a portion of the data field for a signature. The security circuit calculates the signature having a bit length corresponding to a bit length of the portion of the data field reserved for the signature, and codes the signature in the portion of the data field reserved for the signature. For instance, a secure element type circuit can be used to generate the signature, with the secure element operating independently of operating circuitry in the device being used to perform the calculations (and thus ensuring security).

The transceiver transmits the messages, with at least one of the messages having the signature coded therein. Messages received on the communication bus are authenticated based on a signature therein (and/or with related messages). Once authenticated, the signature is removed from the data field and the message is then decoded. Accordingly, one or more messages can be communicated in this regard, using the same or different signatures. For instance, if one of the messages is authenticated, that authentication can be used for other messages, permitting the use of the entire data field. Such approaches may involve, for example communicating on a two-wire communication bus, and/or communicating using dominant and recessive bits to control transmission priority between respective transmitter circuits coupled to the communication bus.

In some implementations, the security circuit operates to authenticate each received message having a signature therein by generating a new signature and comparing the new signature to the signature in the reserved portion of the data field. For messages that are not authenticated, the security circuit modifies the message and the message coder circuit interacts with the one of the messages as being invalid based on the modification thereof by the security circuit. For instance, the modification may cause the message coder circuit to interpret the message as being erroneous. Such approaches may involve modifying a checksum characteristic of the message, thereby controlling the message coder circuit to reject the message.

The respective circuits can be implemented in a variety of manners, and can be combined together or otherwise separated with respective components therein. In some implementations, the message coder circuit is a processor and the security circuit is coupled to pass the messages between the processor and the transceiver. In some implementations, the security circuit includes a secure element that generates the signature independently from the coding circuit, and prevents the coding circuit from accessing the signature.

Various methods may be carried out in accordance with the operation of apparatuses as noted herein. In some embodiments, messages having a data field are generated, and a portion of the data field in one or more of the messages is reserved for a signature. The signature is generated with a bit length corresponding to a bit length of the portion of the data field reserved for the signature (e.g., with the same bit length, or a shorter bit length). The signature is coded in the portion of the data field reserved for the signature. The messages are transmitted on the bus, and received messages are processed as follows. Each received message is authenticated based on the signature, the signature is removed from the data field, and the message is decoded with the signature removed therefrom.

In some implementations, subsequent messages are transmitted by inserting a portion of data in an entire data field thereof, and using the signature in a previous message to provide authentication. In other implementations, each message is transmitted with a signature.

Turning now to the figures, FIG. 1 shows an apparatus 100, in accordance with one or more embodiments. The apparatus 100 includes a security transceiver 110, microcontroller 120 (or other logic circuit) that generates, or codes, messages (e.g., encodes or decodes) for communication over a network 105. Additional security transceivers and microcontrollers may be implemented as well, as shown via security transceiver 130 and microcontroller 140. In various implementations, the respective components at 102 and 104 are implemented as two nodes on a network having many such nodes. The respective security transceivers may be implemented with a network security device 112/132 and transceiver circuitry 114/134, as shown. In this context, the network security devices can be standalone or integrated into a transceiver.

The microcontroller 120 provides a message with a reserved field for a signature, and the security transceiver 110 (or, e.g., network security circuit 112) manipulates the message and/or bit stream as characterized herein, to provide the signature in the data field. Communications are shown passing between the respective transceivers 110 and 130, with a signal path from left to right starting at TXD, continuing via TXD', and RXD'' to RXD''' on the right. Upon receipt of such a message, if the signature does not appear valid the network security circuit can identify the message as invalid (e.g., by modifying the CRC and/or an end-of-frame field that occurs after the CRC). For instance, this may involve causing a controller (e.g., microcontroller 140) to not receive a frame corresponding to the message.

Figure 2:
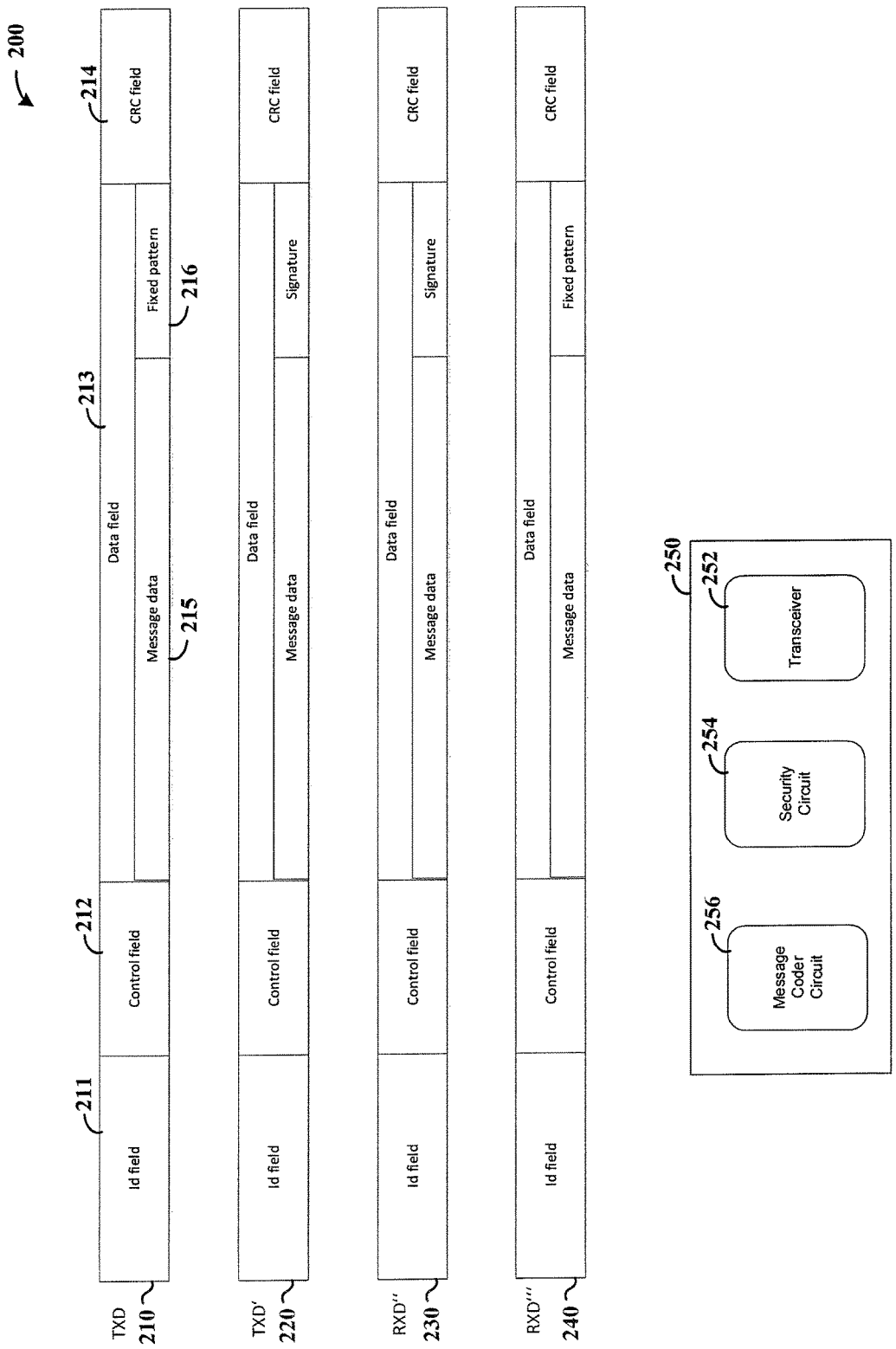
FIG. 2 shows a data structure and communication apparatus, as may be implemented with one or more embodiments.

FIG. 2 shows a data structure 200 and communication apparatus 250, as may be implemented with one or more embodiments. The data structure 200 is, for various embodiments, implemented with the apparatus 100 shown in FIG. 1, with various stages of communication represented by messages TXD (210), TXD' (220), RXD'' (230), and RXD''' (240).

As labeled in message 210 by way of example, each message includes an id field 211, control field 212, data field 213 and CRC field 214. The data field 213 includes a portion 215 reserved for message data, and a portion 216 reserved for a fixed pattern/signature. The message 210 has the fixed pattern at 216 reserved for a signature, with messages 220 and 230 carrying a signature at 216. Message 240 has had the signature removed (e.g., and verified) with the remaining message data passed on.

Apparatus 250 may be implemented with the messages as shown, with a transceiver circuit 252, security circuit 254 and message coder circuit 256. In some implementations, the transceiver circuit 252 communicates data on a communication bus in accordance with a message-based signal protocol, such as a CAN protocol. The message coder circuit 256 operates with the transceiver circuit to generate messages having a data field while reserving a portion of the data field for a signature. The security circuit 254 calculates the signature having a bit length corresponding to a bit length of the portion of the data field reserved for the signature, and codes/adds the signature in the portion of the data field reserved for the signature. The transceiver circuit communicates the data on the communication bus by transmitting the messages having the signature coded therein (e.g., a single message, or many messages). The security circuit operates with the message coder circuit to authenticate each message received on the communication bus (and having a signature coded in a data field therein) based on the signature, remove the signature from the data field, and decode the message with the signature removed therefrom via the message coder circuit The various embodiments described herein may be combined in certain embodiments, and various aspects of individual embodiments may be implemented as separate embodiments. For instance, aspects of FIG. 1 involving respective communication components may be implemented with the data structures in FIG. 2. Similarly, components of FIG. 1 shown separately may be grouped.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., message coding, signature generation, signature addition or removal, and transmitting). For example, in certain of the above-discussed embodiments, one or more modules are discrete logic circuits or programmable logic circuits configured and arranged for implementing these operations/activities, as in the circuit modules shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, different types of messages including more or less information, such as security information and validity information, may be used with the shown approaches. Multiple messages may be used with a certain communication approach in which one or more may include an added signature that can be used in the communication of all messages. Such modifications do not depart from the true spirit and scope of various aspects of the invention, including aspects set forth in the claims.

What is claimed is:

1. An apparatus comprising:
  a transceiver circuit configured and arranged to communicate data on a communication bus in accordance with a message-based signal protocol;
  a message coder circuit configured and arranged with the transceiver circuit to generate at least one message having a data field, and a fixed bit pattern in a portion of the data field reserved for a signature; and a security circuit configured and arranged to calculate the signature having a bit length corresponding to a bit length of the portion of the data field reserved for the signature, and to replace the fixed bit pattern with the signature in the portion of the data field reserved for the signature, wherein
- the transceiver circuit is configured and arranged to communicate data on the communication bus by transmitting the at least one message having the signature coded therein, and
- the security circuit is configured and arranged with the message coder circuit to, for each message received on the communication bus and having a signature coded in a data field therein, authenticate the message based on the signature, remove the signature from the data field, and decode the message with the signature removed therefrom via the message coder circuit.

2. The apparatus of claim 1, wherein the message coder circuit and transceiver circuit are configured and arranged to generate and transmit a plurality of messages based on the signature.

3. The apparatus of claim 1, wherein the message coder circuit and transceiver circuit are configured and arranged to generate and transmit subsequent ones of a plurality of messages by inserting a portion of the data in an entire data field of the subsequent ones of the plurality of messages, using the signature in the at least one message to provide authentication for the subsequent ones of the plurality of messages.

4. The apparatus of claim 1, wherein the message coder circuit, security circuit and transceiver circuit are configured and arranged to generate and transmit subsequent messages by, for each message, reserving a portion of the message for the signature and coding the signature in the reserved portion of the message.

5. The apparatus of claim 1, wherein
- the security circuit is configured and arranged to, for each message received by the transceiver circuit on the communication bus and having a signature in a reserved portion of a data field therein,
  - authenticate the message by generating a new signature and comparing the new signature to the signature in the reserved portion of the data field,
  - in response to the message being authenticated, remove the signature from the message and forward the message with the signature removed to the message coder circuit and replace the signature in the reserved portion of the data field with the fixed data pattern; and
- the message coder circuit is configured and arranged with the security circuit to access data in authenticated ones of the messages.

6. The apparatus of claim 5, wherein
- the security circuit is configured and arranged to, in response to one of the messages not being authenticated, modify the message, and
- the message coder circuit is configured and arranged with the security circuit to interact with the one of the messages as being invalid based on the modification thereof by the security circuit.

7. The apparatus of claim 6, wherein the security circuit is configured and arranged to modify the message in response to the message not being authenticated by modifying a checksum characteristic of the message, thereby controlling the message coder circuit to reject the message.

8. The apparatus of claim 1, wherein the message coder circuit is a processor circuit, and the security circuit is coupled to pass the messages between the processor circuit and the transceiver circuit.

9. The apparatus of claim 1, wherein the security circuit includes a secure element configured and arranged to generate security information including the signature independently from the message coder circuit, and to prevent the message coder circuit from accessing the security information.

10. The apparatus of claim 9, wherein the transceiver circuit includes the security circuit, and wherein the security circuit is configured and arranged to incorporate the security information in each respective message generated by the message coder circuit.

11. The apparatus of claim 1, wherein the transceiver circuit is configured and arranged to communicate the data on the communication bus using dominant and recessive bits to control transmission priority between respective transmitter circuits coupled to the communication bus.

12. A method comprising:
- generating at least one message having a data field, and a fixed bit pattern in a portion of the data field reserved for a signature;
- calculating the signature as having a bit length corresponding to a bit length of the portion of the data field reserved for the signature;
- replacing the fixed bit pattern with the signature in the portion of the data field reserved for the signature;
- communicating data including the data field, on a communication bus in accordance with a message-based signal protocol by transmitting the at least one message having the signature coded therein; and
- for each message received on the communication bus and having a signature coded in a data field therein, authenticating the message based on the signature, removing the signature from the data field, and decoding the message with the signature removed therefrom.

13. The method of claim 12, further including:
transmitting subsequent ones of a plurality of messages by inserting a portion of the data in an entire data field of the subsequent ones of the plurality of messages, and using the signature in the at least one message to provide authentication for the subsequent ones of the plurality of messages.

14. The method of claim 12, further including generating and transmitting subsequent messages by, for each message, reserving a portion of the message for the signature and coding the signature in the reserved portion of the message.

15. The method of claim 12, further including, for each message received on the communication bus and having a signature in a reserved portion of a data field therein,
- authenticating the message by generating a new signature and comparing the new signature to the signature in the reserved portion of the data field, and
- in response to the message being authenticated, removing the signature from the message and accessing data in the message with the signature removed.

16. The method of claim 12, further including:
- in response to one of the messages not being authenticated, modifying the message, and
- interacting with the one of the messages as being invalid based on the modification thereof.

17. The method of claim 16, wherein modifying the message includes modifying a checksum characteristic of the message, thereby controlling a message coder circuit to reject the message.

18. The method of claim 12, wherein communicating the data on a communication bus in accordance with a message-based signal protocol includes using dominant and recessive bits to control transmission priority between respective transmitter circuits coupled to the communication bus.

19. An apparatus comprising:
a vehicle network communication bus configured and arranged to transmit data;
a vehicle control circuit configured and arranged to generate a control signal that operates with an external circuit to modify an operational characteristic of a vehicle in which the vehicle network communication bus operates;
a plurality of network circuit nodes;
at one of the network circuit nodes,
a transceiver circuit configured and arranged to communicate data on the vehicle network communication bus in accordance with a message-based signal protocol;
a message coder circuit configured and arranged with the transceiver circuit to generate a first message having a data field, and a fixed bit pattern in a portion of the data field reserved for a signature;
a security circuit configured and arranged to calculate the signature having a bit length corresponding to a bit length of the portion of the data field reserved for the signature, and to replace the fixed bit pattern with the signature in the portion of the data field reserved for the signature, wherein
the transceiver circuit is configured and arranged to communicate a first portion data on the communication bus by transmitting the first message having the signature coded therein, and to communication a second portion of the data on the communication bus by transmitting a second message not having the signature coded therein, and
the security circuit is configured and arranged with the message coder circuit to, authenticate the first message based on the signature, authenticate the second message based on the signature in the first message, remove the signature from the data field, and decode the first message with the signature removed therefrom via the message coder circuit; and
wherein the vehicle control circuit is configured and arranged to modify the operational characteristic of the vehicle based on the decoded message.

20. The apparatus of claim 19, wherein
the security circuit is configured and arranged to, in response to the first message not being authenticated, modify the first message, and
the message coder circuit is configured and arranged with the security circuit to interact with the first message as being invalid based on the modification thereof by the security circuit.

* * * * *